June 1, 1965
J. L. OTTERLEI
3,187,337
TELEMETERING SYSTEM
Filed Sept. 5, 1961
2 Sheets-Sheet 1
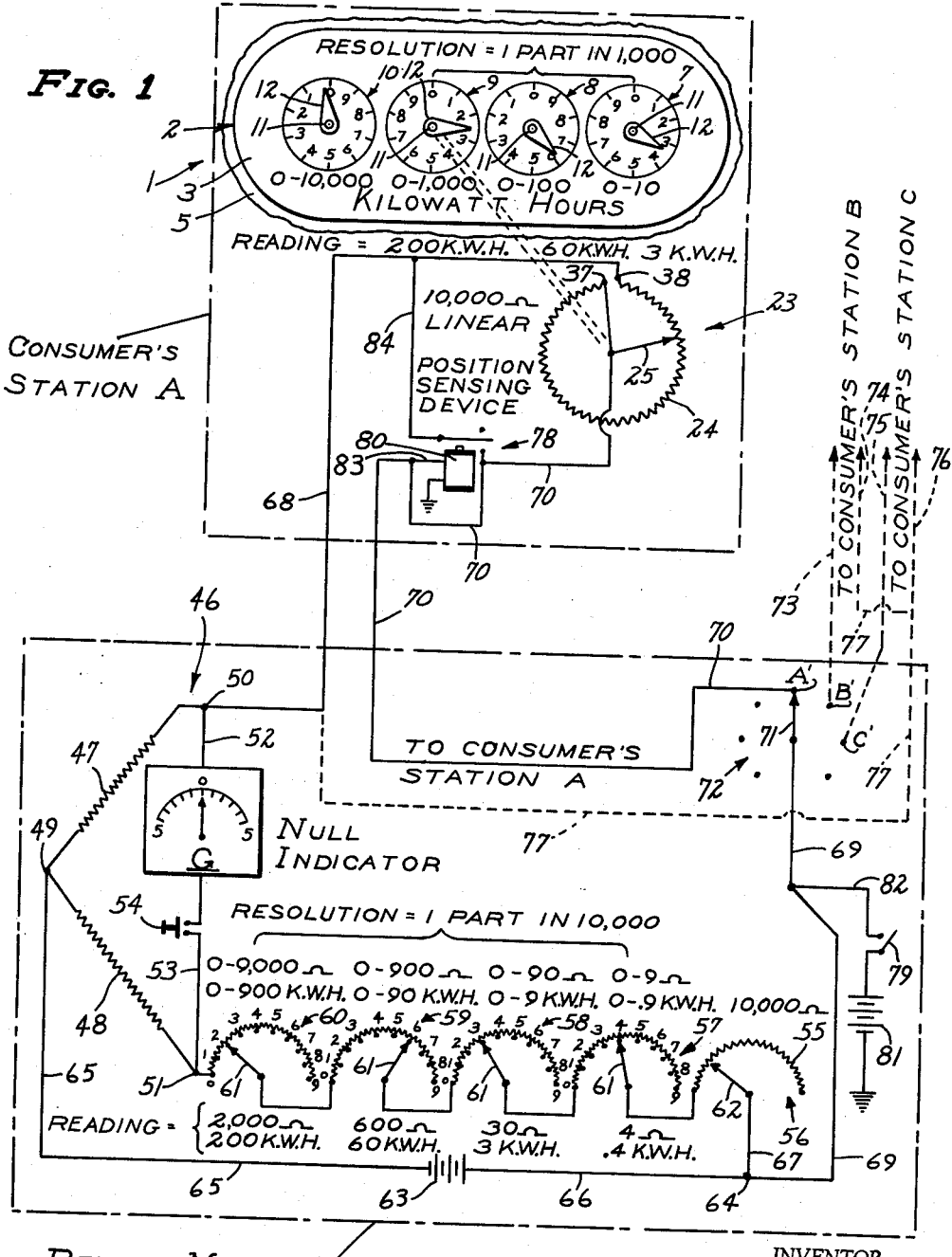
INVENTOR.
JON L. OTTERLEI
BY
Merchant, Merchant & Gould
ATTORNEYS June 1, 1965
J. L. OTTERLEI
3,187,337
TELEMETERING SYSTEM
Filed Sept. 5, 1961
2 Sheets-Sheet 2
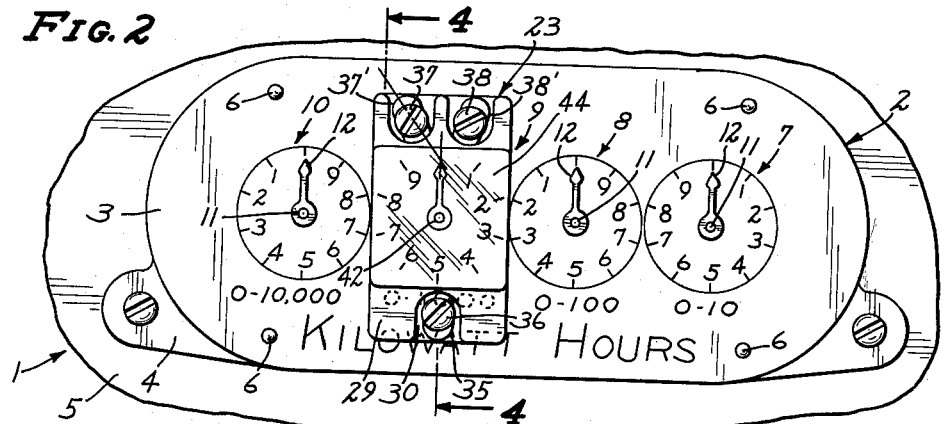
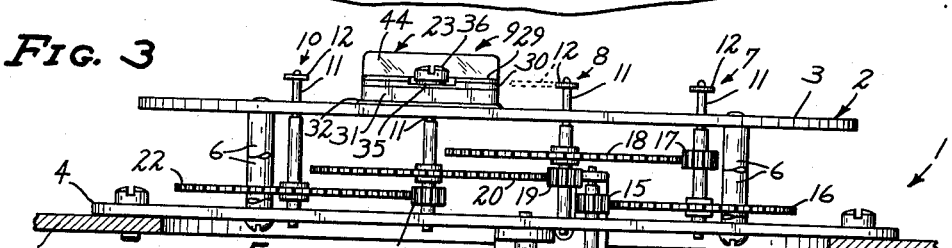
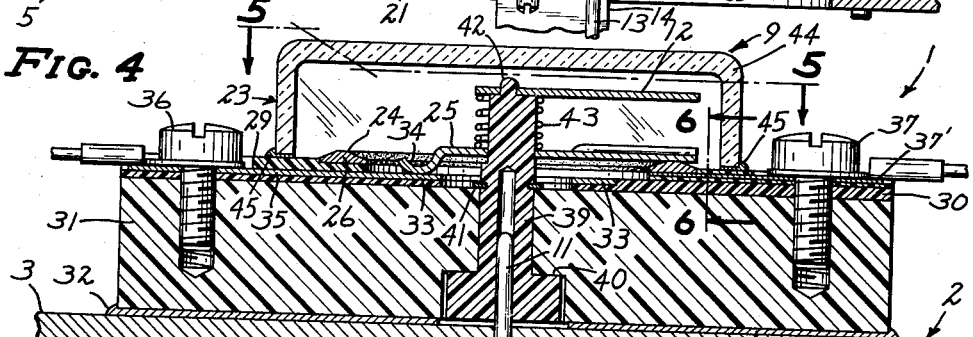
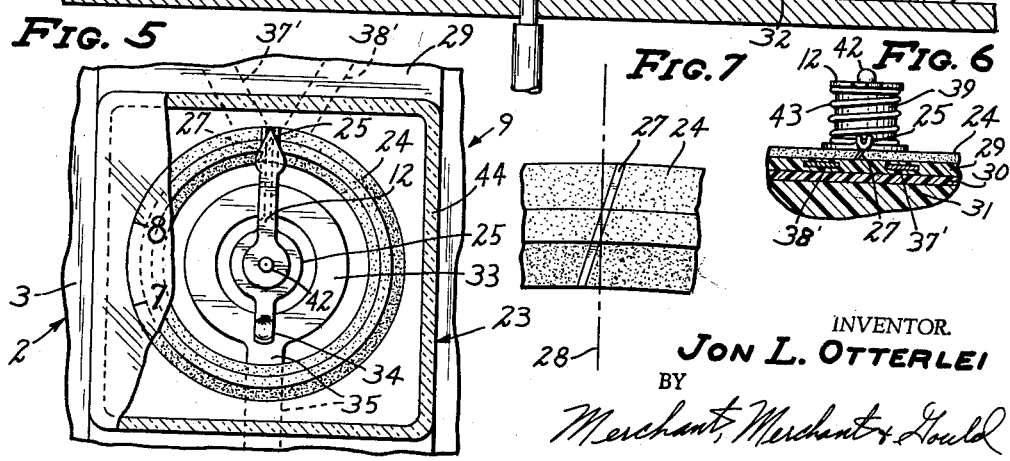
INVENTOR.
JON L. OTTERLEI
BY
Merchant, Merchant & Gould
ATTORNEYS

United States Patent Office 3,187,337
Patented June 1, 1965

3,187,337
TELEMETERING SYSTEM
Jon L. Otterlei, Hopkins, Minn., assignor to Zodiak Electronics Corporation, St. Paul, Minn., a corporation of Minnesota
Filed Sept. 5, 1961, Ser. No. 135,956
2 Claims. (Cl. 340—201)

My present invention relates to telemetering systems of a particular class comprising, and having for their purpose the remote reading of, that type of commodity meter employing a series of rotating indicators each indicating a different quantity of the same commodity, such as electricity or gas or water, sold to consumers between meter reading periods of established spacing and supplied thereto from remote sources through suitable transmission means or media; such transmission means or media generally comprising electrical conductors when the commodity is electricity and suitable pipe lines when the commodity is a fluid such as gas and water.

As is well known, it is the said type of commodity meter involving a series of rotating quantity indicators that is presently and has long been the accepted standard type of meter employed by suppliers of the above mentioned commodities (gas, electricity and water). Some of the reasons for the wide spread preference for an acceptance of such multi-indicator meters are their ability to continuously indicate, within each complete meter cycle, the progressive consumption of a metered commodity, up to a large quantity such as would normally require for consumption the time covered by a series of several or many meter reading periods, while providing a very high degree of resolution allowing quick and highly accurate visual reading, and all this within a relatively confining space.

It will be appreciated that in quantity meters of said type having a serially arranged plurality of rotary indicators the indicators of the series thereof are geared together to rotate at progressively and uniformly decreasing speed from one end of the series of indicators toward the other end thereof, to successively indicate correspondingly greater quantities of the measured commodity per revolution, and that one complete cycle of any such meter is equal to one 360° advancement of its slowest operating indicator. Depending to a great extent upon the particular commodity being measured, meters of the said types generally have from a minimum of three (3) to a maximum of five (5) rotary indicators and in cases where the commodity is electricity, the meters employed to measure the quantity of electrical power consumed usually have from a minimum of four (4) to a maximum of five (5) cooperating indicators. Usually, the fastest operating indicators, which will be considered as the first in any series of indicators, is at the extreme right as one faces such a meter and adjacent rotary indicators of the series bear a ten (10) to one (1) speed ratio with respect to one another and each individual indicator has a scale divided into ten (10) equal parts. Hence, it will be seen that there is a ten (10) to one (1) speed ratio between the first and second indicators of such a series of indicators; a speed ratio of 100 to 1 between the first and third rotary indicators of such a series of indicators; a speed ratio of 1,000 to 1 between the first and fourth indicators of such a series of indicators, and so on. Also, it should be evident that, whereas the resolution provided by only one of the slower operating indicators, such, for example, as the third in the series, is relatively very low; the resolution provided by the relatively slow operating indicators combined with the faster operating indicators of the series thereof is very high; the resolution provided by the combination of the first three indicators of the series being, in fact, one part in 1000 parts.

As is also well known, each of said commodities (gas, electricity and water), is usually supplied by a different supplier, such as a so-called utility company, to a large number of, often many thousands of, individual consumers and each such supplier places a visual reading meter at each consumer's station to measure and visually indicate the quantity of the metered commodity consumed between successive meter reading periods. Since many consumers of one of the commodities mentioned (gas, electricity and water) are also consumers of one or both of the other of said commodities, and since some consumers consume the same commodity under a plurality of conditions each requiring a separate meter, it is obvious that there are two, three or more commodity meters located at each of a large proportion of the many consumer's stations. When it is considered that the generally standard meters employed by the suppliers are of the said multiple-indicator type, it will be appreciated that the number of this type of meter presently in service is very great and represents a tremendous capital investment.

Customarily, the supplier of each different commodity has its own meter readers to each of whom is assigned the responsibility of inspecting and directly reading all of that supplier's meters at consumer's stations within a specified territory, or all of that supplier's meters of a specified catogory within a specified territory, at regular meter reading periods which are often spaced apart one calendar month when the consumer stations are those of modest or low volume consumers such as private dwellings and other domestic institutions but which meter reading periods may be much more frequent when the consumer stations are those of large volume commercial consumers, for example. The cost of this periodically reading, by direct inspection at each station, all of the said standard type (multi-indicator type) of commodity meters is an extremely costly procedure which has long been looked upon in the industries of the respective commodity suppliers as an excessive and extremely unsound burden which they and the consumers must bear until some less expensive system of periodical meter reading becomes available within the limits of practical application and sound capital investment. It is, of course, this great expense burden and other obviously objectionable features of the direct meter reading, at the consumer's station, that has resulted in a longstanding and well recognized demand in the industries of the suppliers of commodities such as electricity, gas and water for a telemetering systm, whereby many or possibly all of a commodity supplier's meters can be read, at periods of desired frequency, from a remote central reading station.

Because of the high order of resolution and resultant ease and accuracy of reading of, and the tremendous capital investment in, commodity meters of the said multi-indicator type, one of the primary requirements for a commercially acceptable telemetering system is, and has long been, that such multi-indicator type meters be retained as the actual quantity of consumption measuring and, consumer's station located, visual indicating instrumentality of the system. Obviously, the retention of this multi-indicator meters at the consumer station provides a continuous consumption record against which telemetered results can be checked at any time.

Responsive to the above noted longstanding demand, a number of so-called telemetering systems for the remote reading of consumer's station located commodity meters of the said multi-indicator type have previously been proposed, but insofar as this applicant has been able to determine by extensive investigation, previous proposals for the remote reading (telemetering) of commodity meters of the above mentioned multi-indicator type have been found commercially objectionable and generally unacceptable for various different reasons including one or more of the following, to wit:

A. Undue complexity.

B. Excessive cost.

C. Inaccuracy of indication at both the remote meter reading station and the consumer's station.

It appears that the above noted and other objectionable characteristics of prior art telemetering systems involving the remote reading of the generally standard type of commodity meter having a plurality of cooperating rotary indicators, can generally be attributed to a rather widely prevalent concept, by the designers and proponents of such prior art systems, which seems to have been to the following effect, namely, that because meters of the said type involving a plurality of rotary indicators each indicating a different quantity of the same commodity, have found such wide spread acceptance, due at least largely to the high order of resolution provided thereby, it was necessary to transmit to the remote meter reading station intelligence directly indicative of the angular position of each of the individual indicators of the series of rotary indicators of the quantity meter at the consumer station by means comprising a separate position sensing device for and driven from each of the rotary indicators of the consumer station meter, including the fastest operating of its series of rotary indicators. Not only are telemetering systems based on this old concept objectionally complex and costly, as indicated under A and B above, but, as pointed out under C above, are further objectionable as being a potential and, in fact, probable cause of inaccuracy of indication both at the consumer's stations and the remote meter reading stations; the latter objectionable characteristic, when present, being the result of overloading and slowing down the rotary indicator motivating means of a multi-indicator meter at the consumer's station by driving therefrom, through each of a plurality of its rotary indicators, including the fastest operating, lowest torque output one or ones thereof, a different torque absorbing, position sensing device.

Among the important objects and advantages of the instant invention, which deals exclusively with the solving of problems peculiar to telemetering systems of the class which have for their purpose the remote reading of and comprise commodity meters of the said multi-indicator type, is the provision of improvements in telemetering systems of said class whereby to eradicate the above mentioned and other objectionable characteristics of known prior art systems of the same general class.

More positively stated, telemetering systems of the class described, produced in accordance with my novel concept possess the following desirable features or characteristics, to wit:

A. An important simplification of apparatus as compared to known prior art systems of a class to which this invention pertains;

B. An important simplification of transmission means or media requirements as compared to known systems of a class to which this invention pertains;

C. Greatly reduced costs of apparatus and installation as compared to known prior art systems of the class to which this invention pertains; and D. The maintenence of accuracy of indication of the multi-indicator meter at the consumer station and of the telemetered indication at the remote meter reading station, while at the same time providing indicator resolution at the remote meter reading station of a desirably high order which may be equal to or better than that provided by the multi-indicator meter at the consumer station.

Telemetering systems of the instant invention differ from known prior art telemetering systems of the same general class (the class comprising a commodity meter of the multi-indicator type) primarily by the fact that in systems built in accordance with my novel concept the position of only a selected one of the series of indicators of a meter at a consumer station is telemetered to a remote meter reading station or point; whereas, as previously indicated, in known prior art telemetering systems of the same general class the positions of a plurality of and generally all of the indicators of the series of indicators of the commodity meter at the consumer station are telemetered to the remote meter reading station. In accordance with my invention, the single indicator selected for the purpose is one of the meter's series of indicators that advances less than 360° between meter reading periods of established spacing, and is an indicator other than the fastest operating one of the meter's series of indicators and generally will be an indicator other than the fastest operating two of the series of indicators. Since the second fastest operating indicator of a series thereof have have approximately ten times the torque output of the fastest operating indicator of the series and the third from the fastest operating indicator of a series thereof have approximately one hundred times the torque output of the first or fastest operating indicator in the series, one of the said second or third fastest operating indicator of a series thereof will usually be found to have sufficient torque to drive a suitable position sensing device without overloading the meter indicator motivating means and upsetting the accuracy of the meter. When the commodity being measured by the multi-indicator meter at the consumer's station is electricity, I chose, generally as a basis for operation of the single position sensing device to be associated with the consumer station meter, the third from the fastest operating indicator of the series which operates approximately $1/100$ of the speed of the first or fastest operating indicator of the series and has approximately one hundred times the torque output of the said fastest operating indicator of the series. In practice, I find that in all standard makes of electrical power consumption meters, the rotary shaft of the third indicator in the series thereof delivers sufficient torque to drive a suitable position sensing device without jeopardizing the accuracy of the meter and that in some cases, depending upon several variable factors including the make or model of the meter and the torque load imposed by the sensing device, the second indicator in the series, which has approximately ten times the torque output of the first indicator in the series, can also be used without slowing down the meter movement at least beyond that which can be compensated for by adjustment.

My inventive concept takes into consideration the fact that any selected one of a commodity meter series of indicators that advances less than 360° between immediately successive meter reading periods provides as accurate an indication of the quantity of consumption as does the combination of that indicator and the remaining faster operating indicator or indicators in the series, but that the resolution of such a selected single indicator taken alone is of relatively very low order as compared to the order of resolution provided by the combination of such selected indicator and the faster operating indicator or indicators of the series thereof.

My inventive concept further takes into consideration the following facts, to wit:

A. That loss of accuracy of indication, such as may be caused by overloading of the motivating means of a multiple-indicator commodity meter at a consumer station, cannot generally be corrected or compensated for at a subsequent point in the telemetering system of which said meter is a part; but B. That loss of resolution of indication, such as may result from telemetering only a selected one of a series of a meter's rotary indicators other than the fastest operating one of a series thereof and failing to telemeter the faster operating indicator or indicators of a series thereof, can readily be regained or brought up to a level well above the order of resolution provided by a selected one of a meter's series of rotary indicators plus the faster operating indicator or indicators of a series thereof through selection of suitable electrical instrumentation at the remote meter reading station.

In fact, instrumentation suitable for my purpose has been well known to those skilled in the art for many years and was available to, but apparently outside of the concepts of, those of my predecessors who thought it necessary to telemeter a plurality of individual indicators of a multi-indicator commodity at a consumer station in order to provide the basis for accurate remote readings of the multi-indicator meter at the consumer station and the systems of which predecessors were subject to serious objections herein before mentioned.

The above and other highly important objects and advantages of the instant invention will be apparent from the following specification, claims and appended drawings.

In the accompanying drawings, like characters indicate like parts throughout the several views.

Referring to the drawings:

FIG. 1 is a schematic view diagrammatically illustrating the electrical and mechanical hookups of one embodiment of the invention;

FIG. 2 is a greatly enlarged fragmentary view, in elevation, of the indicator section or apparatus of a conventional commodity meter having a position sensing device operatively associated with a selected one of its series of indicators;

FIG. 3 is a view in side elevation of the indicator apparatus of FIG. 2 as seen from the line 3—3 of FIG. 2;

FIG. 4 is a detailed sectional view on a still further greatly enlarged scale taken approximately on the irregular line 4—4 of FIG. 2;

FIG. 5 is a view partly in top plan and partly in horizontal section taken approximately on the line 5—5 of FIG. 4 and being on a slightly reduced scale with respect to FIG. 4;

FIG. 6 is a fragmentary sectional view taken on the line 6—6 of FIG. 4; and

FIG. 7 is a very greatly enlarged fragmentary plan view of the generally annular fixed resistance element of the position sensing device of figures of previous figures.

In FIG. 1 the station of the consumer of the commodity electricity is indicated by broken lines identified by the caption "Consumer Station A," and a remotely located meter reading station is indicated by broken lines identified by the caption "Remote Meter Reading Station."

Located at the Consumer Station A is a meter of the before described multi-indicator type indicated as an entirety by the numeral 1, all major parts of which have been broken away or otherwise omitted in the drawings hereof except for the multiple-indicator section of the meter which is indicated in its entirety by the numeral 2. For the purpose of the present illustration, the commodity being measured by the multiple-indicator meter 1 is electricity and the meter indicators are calibrated to be read in terms of "Kilowatt Hours" as indicated on the indicator dial plate 3 in FIGS. 1 and 2. The frame or supporting structure of the said indicator section 2 of the multi-indicator quantity meter 1 comprises the said dial plate 3 and a spaced parallel mounting plate 4 the latter of which is mounted on major frame work 5 of the meter 1; the said plates 3 and 4 being rigidly connected together by suitably anchored spacers 6, shown best in FIG. 3.

As illustrated, the meter 1 has a series of four (4) indicators; the first or fastest operating indicator of said series of indicators being indicated by 7; the second fastest operating indicator of the series being indicated by 8; the third from the fastest operating indicator of the series being indicated by 9 and the fourth or slowest operating indicator of the series being indicated by 10. Each of the indicators 7–10 comprises a rotary shaft 11 carrying a pointer 12 working over a circular scale printed on the dial plate 3 and divided into ten (10) equal parts by division points respectively marked 0, 1, 2, 3, 4, 5, 6, 7, 8 and 9. The indicator shafts 11 of indicators 7–10 are journalled in the spaced frame plates 3 and 4, shown best in FIG 3, and are driven from a common indicator motivating means, not shown, through means comprising a power driven shaft 13 and gearing shown best in FIG. 3; the power driven shaft 13 being journalled in a bracket 14 carried by the plate 4. The indicator shaft 11 of indicator 7 is directly driven from the shaft 13 through a pair of speed reduction gears 15 and 16. The rotary shaft 11 of indicator 8 is in turn driven from the shaft 11 of indicator 7 by a pair of speed reduction gears 17 and 18. The shaft 11 of indicator 9 is in turn driven from the shaft 11 of indicator 8 by a pair of speed reduction gears 19 and 20. Finally, the shaft 11 of indicator 10 is driven from the shaft 11 of indicator 9 through a pair of speed reduction gears 21 and 22. As previously indicated, the pairs of gears 17–18, 19–20 and 21–22 each provide a 10–1 speed reduction, whereby the rotary elements of the indicator 8 operate at one tenth the speed of the indicator 7; the rotary elements of the indicator 9 operate at one hundredth the speed of the rotary elements of the indicator 7 and the rotary elements of the indicator 10 operates at one thousandth of the speed of the rotary elements of the indicator 7. As indicated at FIG. 1, the indicator 7 indicates 0–10 kilowatt hours (kwh.) per revolution; the indicator 8 indicates 0–100 kwh. per revolution; the indicator 9 indicates 0–1000 kwh. per revolution and the indicator 10 indicates 0–10,000 kwh. per revolution. Otherwise stated, each scale division of indicator 7 represents one (1) kwh.; each scale division of indicator 8 represents ten (10) kwh.; each scale division of indicator 9 represents one hundred (100) kwh. and each scale division of indicator 10 represents one thousand (1000) kwh.

In FIG. 2, the several indicators are all at "0" positions but in FIG. 1, the indicators have advanced to positions indicating a consumption, between adjacent meter reading periods of predetermined spacing, of 263 kwh. In accordance with this illustration (FIG. 1), the first indicator of the series of indicators 7–10 that has made less than one complete revolution since the last reading period, when all indicators were at the "0" positions of FIG. 2, is the indicator 9 which has advanced a distance that is hard to determine beyond two division points, except by reference to the faster operating indicators 7 and 8 which show that the advancement of the indicator pointer 12 of indicator 9 from a "0" setting was 2.63 scale divisions. Hence, it will be seen that, whereas the order of resolution provided solely by the indicator 9 is a very low order and the resolution provided solely by the indicator 10 is of still lower order; the resolution provided by the combination of indicators 9, 8 and 7, for example, is a very high order, namely one part in one thousand parts by full scale divisions.

For the purpose of the present illustration, the single position sensing element associated with the multi-indicator type commodity meter at a consumer's station is directly driven from the rotary shaft 11 of the meter's indicator 9. In the drawings however, a suitable position sensing device is indicated as an entirety by the numeral 23. Broadly considered, the sensing device 23, as illustrated for the purpose of the present example, is a variable impedance device, since it does provide a variable impedance to the flow of an electrical current. More specifically however, this particular variable impedance device, as illustrated for the purpose of the present example, is a variable resistance in the form of a potentiometer or rheostat. Resistance is, of course, just one of three quantities (resistance, capacitive reactance and inductive reactance) of which impedance can be made up. Since the difference between a potentiometer and a rheostat resides in the number of active terminals (there being three in the case of a potentiometer and two in the case of a rheostat), the term potentiometer will be used herein in a broad and liberal sense to cover both forms of variable resistance devices.

The sensing device 23 comprises a generally annular fixed resistance element 24 and a cooperative movable element in the form of a wiper arm 25. The resistance element 24, as shown in FIGS. 4–7, is of the type comprising a base 26 of insulating material having a conductive outer surface formed by metallic deposition. This potentiometer is preferably of the type known particularly in the computer art as a 360° potentiometer and for this reason the adjacent ends of the arcuate resistance element 24 have a minimum spacing between them and said space, which is indicated by 27 in FIGS. 5, 6 and 7, extends at a diagonal with respect to a plane or line extending radially from the axes of said resistance element 24 and the cooperating wiper arm 25. By reference particularly to FIGS. 4, 5 and 6, it will be seen that the free end portion of the wiper arm 25 that makes sliding contact with the arcuate resistance element 24 has an arcuate contacting surface whereby the radial line contact is made with the cooperating surface of the resistance element 24. In FIG. 7, the radial line contact of the wiper arm 25 is indicated by broken line 28. By reference to this contact line 28 in FIG. 7, it will be seen that the wiper arm 25 breaks contact with one end of the resistance element 24 and makes contact with the other end thereof simultaneously or with some negligible overlap.

The split annular resistance element 24 is mounted fast on a layer of plastic base material 29 which in turn is mounted on a similar layer of plastic material 30. Said plastic layers 29 and 30 are adhesively secured together and to a heavy plastic mounted base 31 which latter is shown as being adhesively secured at 32 to the dial plate 3 of the indicator mechanism of the meter 1. By reference to FIG. 4, it will be seen that a conductive slip ring 33 is carried by the plastic layer 30 and has frictional wiping engagement with one projected end portion 34 of the potentiometer wiper arm 25 opposite the end thereof which engages the resistance element 24. Also, by reference to FIGS. 4 and 5, it will be seen that a ribbon-like terminal strip 35 extends from the slip ring 33 and is provided at its outer end with a terminal or junction point 36. By further reference to FIGS. 2, 4 and 5, it will be seen that opposite ends of the substantially annular resistance element 24 are respectively extended to terminal or junction points 37 and 38 by ribbon-like terminal strips 37' and 38', which latter have been omitted in FIG. 1. The junction points 36, 37 and 38 are represented by terminal screws in FIG. 2. The wiper arm 25 is mounted on and for common rotation with a short hollow shaft 39 that is journalled in the base member 31 and is held against axial movements therein by a shoulder 40 and a conventional split retainer ring 41. By reference particularly to FIG. 4, it will be seen that the potentiometer shaft 39 is driven directly from the rotary shaft 11 of indicator 9 by being press fit thereon as a replacement for the pointer 12 of indicator 9 which was removed from its original position on shaft 11 of indicator 9 and press fit on the reduced diameter upper end portion 42 of the potentiometer shaft 39. Of course, the displaced pointer 12 of indicator 9 occupies the same angular position with respect to its cooperating indicator shaft 11 as it did when applied directly to the shaft 11.

The wiper arm 25 floats axially on the shaft 39 but is held against rotation with respect to the shaft 39 by virtue of being snugly fit on a non-symmetrical portion of said shaft 39. The wiper arm 25 is held in sliding surface contact with the variable resistance element 24 and slip ring 33 by a coil compression spring 43. The potentiometer resistance element 24, the wiper arm 25 and the displaced pointer 12 of indicator 9 are enclosed within a transparent glass or plastic cover 44 that may be assumed to be detachably held in place by means of spot applied adhesive as at 45. It will be seen by reference to the drawings, that potentiometer arm 25 and cooperatively associated indicator pointer 12 occupy identical angular positions. As will be seen best by reference to FIGS. 2 and 5, an indicator scale corresponding to the scales of the several indicators 7–10 is printed on the flat surface of the plastic cover 44 for cooperation with the underlying pointer 12.

The instrumentation at the Remote Meter Reading Station may take various different forms without departing from the spirit of the instant invention. However, for the purpose of the instant example, such instrumentation has been shown as comprising an electrical meter 46 in the form of Wheatstone bridge. This Wheatstone bridge comprises fixed resistors 47 and 48, the former of which extends between junction points 49 and 50 and the latter which extends between junction points 49 and 51. A galvanometer, indicated by G, which serves as a "null indicator," is connected between junction points 50 and 51 by leads 52 and 53, the latter of which, leads, has interposed therein a normally open push button switch 54. The third resistance leg of the Wheatstone bridge is the one whose resistance value is adjustable and this resistance leg comprises selected portions of the fixed resistance element 55 of a potentiometer of equivalent 56, and selected portions of resistances decades 57, 58, 59 and 60. The resistance decade 57 comprises nine (9) serially connected resistors of one (1) ohm each; the resistance decade 58 comprises nine (9) serially connected resistors of ten (10) ohms each; the resistance decade 59 comprises nine (9) serially connected resistors of one hundred (100) ohms each and the resistance decade 60 comprises nine (9) serially connected resistors of one thousand (1,000) ohms each. The individual resistors of each of the resistance decades 57–60 extend between adjacent fixed contacts of a different ten (10) position selector switch each of which, selector switches, comprises a rotary switch arm 61 and a different fixed contact for each of the indicated positions 0, 1, 2, 3, 4, 5, 6, 7, 8 and 9. Of course, the potentiometer 56 comprises, in addition to the fixed arcuate resistance element 55, a rotary wiper arm 62.

For the purpose of the present example, the fixed resistance element 24 of the variable impedance position sensing device 23 may be assumed to have a value of 10,000 ohms, as indicated on FIG. 1. Also, for the purpose of the present example, the resistance element 55 of the potentiometer 56 may be assumed to have a resistance value of 10,000 ohms as indicated on FIG. 1. The values of the resistance decades 57–60, as employed for the purpose of the instant example, have already been given and are shown on FIG. 1. The Wheatstone bridge further comprises a source of D.C. potential 63, such as can be provided by a standard cell or cells connected between junction point 49 and a junction point 64 by leads 65 and 66. The arm 62 of potentiometer 56 is connected to said junction point 64 by a lead 67.

A resistance whose value is to be measured, will, of course, define the fourth leg of the bridge and this resistance of unknown value will be connected between junction points 50 and 64 of FIG. 1. Of course, for the present purpose and example, the resistance or impedance whose value is to be measured is primarily that of the sensing device 23 as determined by the angular position of its wiper arm 25. For this purpose, the Wheatstone bridge type of electrical meter may be connected to the angular position sensing device 23 by a suitable electrical transmission means or media which is shown as comprising transmission lines or conductors 68, 69 and 70. As shown in FIG. 1, the line or conductor 68 extends from the junction point 50 of the meter of the "Remote Meter Reading Station" to the junction point 38 at "Consumer Station A" which, junction point 38, is connected to one end of the fixed resistance element 24 of the position sensing device 23. Also, as shown in FIG. 1, the junction point 64 at the "Remote Meter Reading Station" is connected by the lead 69 to a rotary contact arm 71 of a selector switch 72, some of the fixed contacts of which are indicated respectively by A', B' and C'. The purpose of the selector switch 72 is to allow selective connection of the meter 46 at the "Remote Meter Reading Station" to a position sensing device associated with a commodity meter at any one of a plurality of, usually many of, consumer's stations. With the selector arm 71 of switch 72 positioned as indicated in FIG. 1, the meter 46 at the "Remote Meter Reading Station" is connected to read the effective resistance or impedance of the position sensing device 23 at "Consumer Station A" and which, effective resistance, is of course, determined by and is indicative of the angular position of the pointer 12 and shaft 11 of the cooperating indicator 9 and which, angular position, is also indicative of the quantity of the commodity consumed. For the purpose of illustration, there is shown by dotted lines in FIG. 1, a pair of conductors 73 and 74 which are assumed to lead to a Consumer's Station B, not shown, and another pair of conductors 75 and 76 which are assumed to lead to a position sensing device of a meter located at a Consumer's Station C, not shown. The dotted line leads 74 and 76 are connected together and to lead 68 by a lead 77, shown only by dotted lines; whereas the lead 73 is connected to a fixed contact B' of selector switch 72 and lead 75 is connected to a fixed contact C' of selector switch 72.

Preferably, but not essentially, the otherwise free end of the fixed value resistance element 24 of position sensing device 23 is connected to the wiper arm 25. While the "Consumer Station A" and the "Remote Meter Reading Station" appear very close together in FIG. 1, it should be appreciated that these stations will often be separated by considerable distance such as several or many miles.

To enable the transmission line resistance to be measured independently of the effective resistance of the position sensing device 23, I provide, at the "Consumer Station A" and in close association with the sensing element 23, a normally open relay switch 78 that is under control of a normally open manually operated switch 79 at the "Remote Meter Reading Station." The solenoid 80 of the normally open relay switch 78 is adapted to be energized, for the purpose of closing the switch 78, by a circuit comprising a suitable source of potential 81, a lead 82 having interposed therein the normally open switch 79, part of lead 69, arm 71 of selector switch 72, fixed contact A' of said selector switch 72, part of lead 70, a lead 83, said solenoid 80 and ground as a return conductor to the source of potential 81.

*Operation*

Of course, the first thing the operator at the Remote Meter Reading Station must do is to determine which consumer station commodity meter he desires to read and then set the selector switch 72 accordingly. As previously stated, the selector switch 72 is positioned in FIG. 1 to read the commodity meter 1 at the Consumer Station A. The total resistance of the resistance element 24 of the sensing device 23 is of a known value (10,000 ohms for the purpose of the present example), but the resistance values of the transmission lines or conductors coupling the sensing element 23 to the meter 46 at the Remote Meter Reading Station are of unknown and widely variable factor which can not be disregarded.

With the station selector switch 72 properly set, a preferred procedure of operation is as follows:

(1) The switch arms 61 of the selector switches of resistor decades 57–60 and the wiper arm 62 of potentiometer 56 are all set in their extreme counterclockwise "0" positions.

(2) The normally open switch 79 is now closed, thereby causing the normally open relay switch 78 to close and throw a direct shunt across the sensing element resistance 24 by a lead 84 in which the contacts of switch 78 are interposed. Now only the resistance of the transmission lines 68 and 70 is in the telemetering circuit; the small amount of resistance provided by lead 69 being of negligible value and being ignored for the purpose herein. Of course, the resistance of said transmission lines will provide an unbalanced condition in the circuitry of the Wheatstone bridge which will be indicated by deflection of the needle of the null indicator G when the push button switch 54 is closed.

(3) Now, while maintaining the push button switch 54 closed, the wiper arm 62 of potentiometer 56 is advanced from its "0" position to some position whereat the needle or pointer of the null indicator G returns to its "0" position, indicating a nullification of or balancing out of the resistance of the transmission lines.

(4) Now, the switch 79 is opened, thereby opening the relay switch 78 and placing back in the telemetering circuit that portion of the resistance element 24 of the position sensing device 23 representing its advancement in a clockwise direction from its "0" position at the extreme end of resistance element 24 defined by the junction point 38 of FIG. 1. Now, when the push button switch 54 is again closed, the pointer of the null indicator G will again be deflected to indicate an unbalanced condition produced by the introduction into the telemetering circuit of the resistance of the said portion of the resistance element 24 of sensing device 23.

(5) Now, while the push button switch 54 is retained in a closed position, the switch arms 61 of selector switches of resistor decades 57–60 are manipulated until the needle or pointer of the null indicator G again returns to its "0" position, at which time the angular position of the pointer 12 of indicator 9 of the meter 1 at Consumer Station A, the corresponding angular position of the wiper arm 25 of the sensing device 23, and the value of that part of the resistance element 24 actually in the telemetering circuit, and the corresponding amount or quantity of the commodity consumed at the consumer's station, will all be indicated by the numbered positions of the switch arm 61 of the resistor decades 57–60 and with an order of resolution at least equal to or better than that provided by the combination of indicators 9, 8 and 7 of the meter of the consumer's station.

An alternative meter reading procedure is as follows:

A. The potentiometer arm 62 of potentiometer 56 is placed in and retained in its "0" resistance position or omitted completely from the circuitry.

B. Now, the total resistance value of the effective portion of the resistance element of sensing device 23 plus that of the transmission lines is measured.

C. Next, the sensing device is shunted out and the resistance of the transmission lines exclusive of the sensing device is measured.

D. Finally, the effect of resistance value of the sensing device 23, as determined by the angular position of its wiper arm 25, is obtained by subtracting from the total resistance value, obtained under B above, the transmission line resistance value, as obtained under C above. Of course, in accordance with the present example, this resultant resistance value will vary between 0 and 10,000 ohms depending upon the angular position of the wiper arm 25 of sensing element 23 and, with said wiper arm positioned as in FIG. 1, will be 2634 ohms which corresponds to 263.4 kwh.

It should be obvious that the D.C. bridge type of instrumentation illustrated herein merely exemplifies one type of highly satisfactory instrumentation that was available to my predecessors in the art who found it necessary to telemeter the positions of a plurality of indicators of a Consumer Station meter in order to maintain resolution of an order generally equal to that provided by a combination of a plurality of indicators of the consumer station meter. A specific example of another kind of instrumentation suitable for my purpose and also available to my said predecessors is an A.C. bridge which can be constructed to give the same kind of indications as provided by the D.C. bridge illustrated herein. In fact, this latter type of instrumentation, although somewhat more complex than the D.C. instrumentation illustrated, may be a good choice in many instances where D.C. circuitry is impractical, or unavailable, or where A.C. circuitry or transmission means or media is preferred.

An example of more recently developed instrumentation suitable for use as a replacement for the instrumentation shown at 46 in FIG. 1 is commercially available Digital Ohmmeters such, for example as the number Digital Ohmmeter 781 by Non-Linear Systems, Inc., of Del Mar, California. Other circuitry employing A.C. or D.C. volt meters, for example, having suitable accuracy and resolution, should be obvious to those skilled in the art, and in this connection presently available A.C. and D.C. digital voltmeter which should not be overlooked. It should further be appreciated that the type of instrumentation employed at the Remote Meter Reading Station and the particular transmission means or media coupling the same to a single position sensing device of a multi-indicator meter at a consumer's station will further vary according to the nature of the position sensing device itself, which latter may take various different forms without departing from the spirit of the instant invention.

This invention has been thoroughly tested and found to be completely satisfactory for the accomplishment of the above objects; and while I have shown a preferred embodiment thereof, I wish it to be specifically understood that the same is capable of modification without departure from the scope and spirit of the appended claims.

What I claim is:

1. In a telemetering system, a quantity meter located at the station of a consumer of a commodity and operative to indicate the quantity of the commodity consumed, said quantity meter being of the generally standard type having a series of indicators each indicating a different quantity of the same commodity, said indicators each comprising a unidirectionally driven rotary indicator shaft; said indicator shafts being geared together to rotate at uniformly, progressively decreasing speeds from one end of the series toward the other thereof; a single position sensing means operatively associated with said quantity meter; said single sensing means comprising a rotary element and a non-rotary element; positive drive means mechanically coupling for common rotation the said rotary element of the sensing means and a selected one of said meter indicator shafts, other than the one of the indicator shafts at the fastest rotating end of the series of indicator shafts, that advances less than 360° between said meter reading periods of pre-established spacing; said single sensing means comprising an electrical impedance which carries progressively throughout substantially 360° of rotation of its rotary element to assume a value dependent on the angular position of the selected shaft relative to a fixed index point, the other indicator shafts of the meter being free and unencumbered by sensing means, an electrical measuring circuit for determining the value of said impedance with sufficient precision to provide an unambiguous indication of the angular positions of the selected and faster rotating shafts relative to respective index points and the corresponding quantity of the commodity consumed by a meter located at a meter reading station remote from the consumer's station, and electrical transmission means connecting said measuring circuit to said sensing means.

2. The system defined in claim 1 in which the said sensing means is a variable resistance, and wherein as between the rotary element and non-rotary element of the variable resistance sensing means one thereof is a generally circular fixed value resistance element and the other thereof is an electrically conductive wiper having frictional sliding engagement with said fixed value resistance element.

References Cited by the Examiner

UNITED STATES PATENTS

| 2,285,819 | 6/42 | Leathers | 340—183 |
| 3,027,551 | 3/62 | Laurin | 340—177 |

NEIL C. READ, *Primary Examiner.*

THOMAS B. HABECKER, *Examiner.*